United States Patent

[11] 3,601,963

| [72] | Inventor | Glen E. Rauth<br>Winter Park, Fla. |
|---|---|---|
| [21] | Appl. No. | 825,231 |
| [22] | Filed | May 16, 1969 |
| [45] | Patented | Aug. 31, 1971 |
| [73] | Assignee | FMC Corporation<br>San Jose, Calif. |

[54] APPARATUS FOR FRACTURING DEBRIS IN HARVESTER
10 Claims, 6 Drawing Figs.

[52] U.S. Cl............................................. 56/328 R, 56/32
[51] Int. Cl............................................. A01d 51/00
[50] Field of Search........................... 56/328, 30, 32, 27

[56]                     References Cited
                    UNITED STATES PATENTS

| 848,968 | 4/1907 | Chew | 56/32 |
| 1,110,158 | 9/1914 | Straus | 56/32 |
| 1,833,346 | 11/1931 | Ziegler | 56/32 |
| 1,931,519 | 10/1933 | Willett et al. | 56/32 |
| 2,521,491 | 9/1950 | Stukenborg | 56/32 |
| 2,535,542 | 12/1950 | Lehman et al. | 56/328 |
| 2,593,625 | 4/1952 | Stokes | 56/328 |
| 2,886,936 | 5/1959 | Phelps | 56/328 |
| 3,123,963 | 3/1964 | Horton et al. | 56/33 |

Primary Examiner—Russell R. Kinsey
Attorneys—F. W. Anderson and C. E. Tripp

ABSTRACT: A nut harvesting machine with a suction opening to receive the nuts is disclosed. Two stick-breaking rotors are mounted in the opening for rotation on parallel axes. Each rotor has angularly spaced bars which intermesh with the bars of the other rotor. The two rotors are rotated in unison to fracture sticks drawn therebetween. The rotors are reversible to dislodge an oversize stick therefrom. A freely hanging wiper plate engages the bars of the rotating rotors to remove any vegetation therefrom.

PATENTED AUG 31 1971
3,601,963
SHEET 1 OF 2
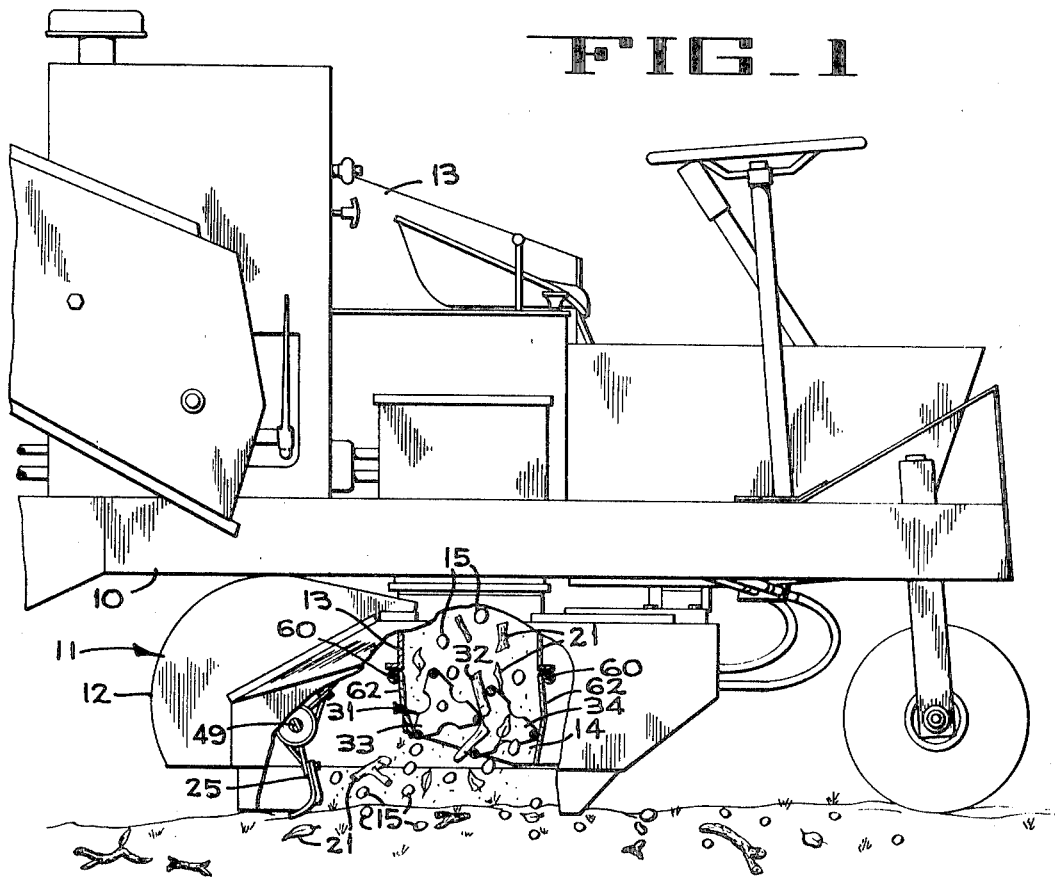
FIG_1
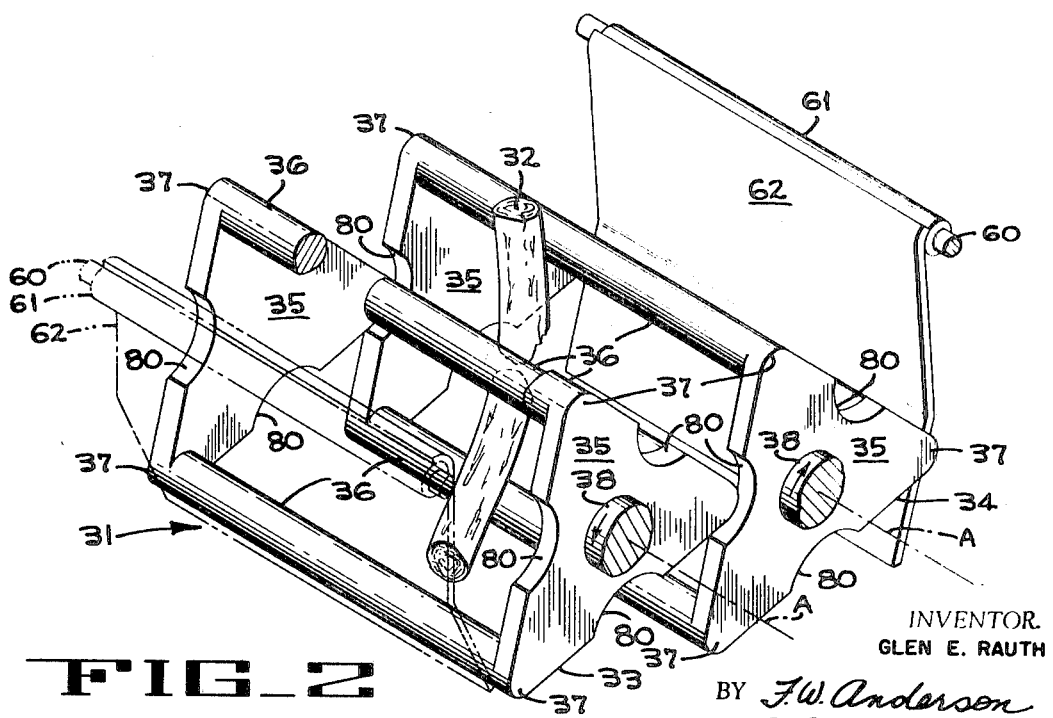
FIG_2
INVENTOR.
GLEN E. RAUTH
BY F.W. Anderson
C. C. Tripp
ATTORNEYS

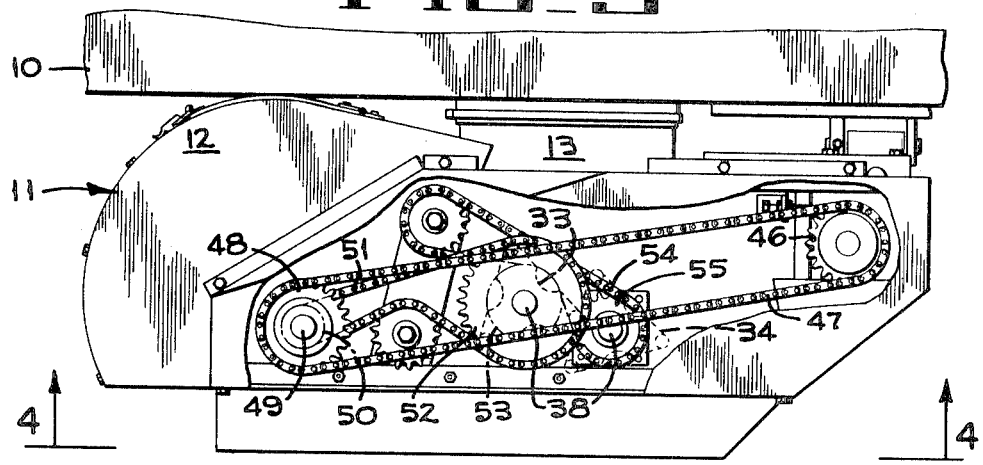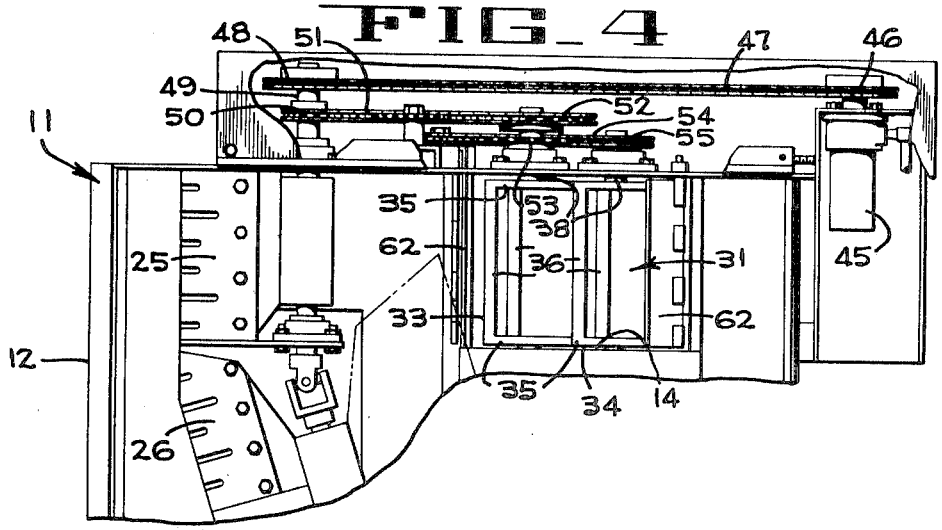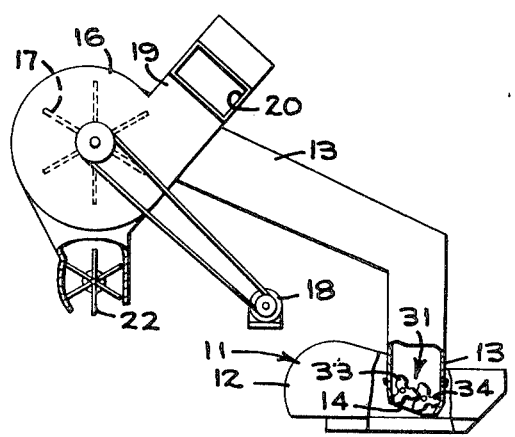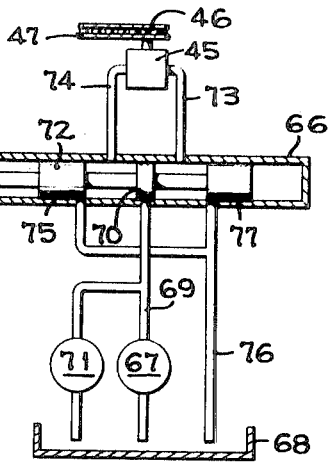

APPARATUS FOR FRACTURING DEBRIS IN HARVESTER

BACKGROUND OF THE INVENTION

Machines for harvesting crops frequently have many mechanisms therein to separate the crops from stones, dirt, sticks, and other debris which might have been picked up with the crops. It is especially important to provide effective separating apparatus in a nut harvester because mechanism which efficiently picks up nuts also gathers an assortment of debris. Frequently large sticks are picked up with the nuts, and if large enough, will clog the machine.

SUMMARY OF THE INVENTION

There is provided by the apparatus of the present invention, mechanism to fracture sticks, as they enter the machine, into fragments of a size which can be conveniently separated from the nuts without clogging the machine. The stick-breaking apparatus, in the preferred form, comprises two rotors mounted for rotation in the suction inlet of the machine on spaced-apart parallel axes. Each rotor has a plurality of angularly spaced bars parallel to the axis of rotation of the rotor and spaced apart sufficiently to allow free passage of the nuts. The two rotors are mounted in intermeshing relationship, and operate, when rotated in unison, to fracture a stick drawn therebetween. If a stick is too large to fracture, the rotors can be reversed to dislodge the oversize stick therefrom. Wiper plates are mounted on each side of the pair of rotors to engage the bars of the rotors as the rotors rotate to remove vegetation therefrom.

It is therefore one object of the present invention to provide apparatus to prevent clogging of a harvesting machine by large debris. It is another object of the present invention to provide a nut harvesting machine with apparatus to fracture sticks and large debris received therein. It is yet another object to provide, in a nut harvesting machine, mechanism to fracture sticks into smaller fragments which can effectively be separated from the nuts by separating apparatus in the machine. It is still another object of the present invention to provide a stick-breaker in a nut harvesting machine which can be reversed to dislodge oversize sticks. It is yet another object of the present invention to provide mechanism to remove vegetation from a stick-breaker in a harvesting machine.

BRIEF DESCRIPTION OF THE DRAWINGS

FIG. 1 is a fragmentary side view of a nut harvester incorporating the present invention;

FIG. 2 is an enlarged view in perspective showing the stick-breaking rotors;

FIG. 3 is a side view, with parts broken away, of the drive mechanism for the rotors;

FIG. 4 is a view taken on the line 4—4 of FIG. 3;

FIG. 5 is a schematic diagram of the suction system of the nut harvester of FIG. 1; and FIG. 6 is a schematic diagram of a portion of the hydraulic system of the machine showing the motor for the rotors.

DESCRIPTION OF THE PREFERRED EMBODIMENT

There is shown in FIG. 1 a portion of a nut harvesting machine having a frame 10 and having a pickup head 11 depending from the frame. The pickup head 11 has a housing 12 into which a suction duct 13 extends. The suction duct has an inlet opening 14 through which nuts 15 are drawn by the suction in the opening 14. As shown in FIG. 5, the suction duct 13 is connected to a blower housing 16 in which a fan 17 is mounted. The fan is driven by motor 18 to expel air from the housing 16 through discharge duct 19 and out discharge opening 20. Debris 21, picked up with nuts 15, is carried up suction duct 13, through blower housing 16, and out duct 19 through opening 20. The nuts are drawn up duct 13, through housing 16, and drop out through the continuous rotating vacuum sealing valve 22.

A rotating brush 25 is mounted in housing 12, ans shown in FIGS. 1 and 4, to sweep nuts forwardly under the suction inlet opening 14. A side brush 26 (FIG. 4) is also mounted in the housing to sweep nuts into the path of the opening 14.

Frequently debris too large to be separated from the nuts by mechanism (not shown) in the machine is swept or passes under the inlet opening 14 and is drawn up into suction duct 13. The stick-breaking mechanism, indicated generally at 31, is provided to fracture these sticks, such as stick 32. As shown best in FIG. 2, the mechanism 31 comprises two rotors 33, 34, each having two spaced-apart triangular sideplates 35 connected together by bars 36 extending between the apexes 37 of the triangular sideplates A stub axle 38, secured centrally to each sideplate, is journaled in housing 12 and has a central axis A about which the rotor rotates when driven.

As shown best in FIGS. 3 and 4, hydraulic motor 45 has a sprocket 46 thereon which receives chain 47. Chain 47 is also received on sprocket 48 which is mounted on the shaft 49 of brush 25. Shaft 49 also carries sprocket 50 which is connected, by chain 51, to sprocket 52 on axle 38 of rotor 33. Axle 38 of rotor 33 carries another sprocket 53 which is connected by chain 54 to sprocket 55 mounted on axle 38 of rotor 34. Thus, as rotary hydraulic motor 45 runs, rotors 33 and 34 are driven in unison in opposite directions. As shown by arrows in FIG. 2, rotor 33 is driven counterclockwise and rotor 34 is driven clockwise.

A horizontal bar 60 is mounted in the pickup head on each side of the pair of rotors. A bushing 61 is loosely received on each bar for free rotation relative thereto. A plate 62, the lower end of which is bent slightly inward, is welded to bushing 61. The plate engages the outermost bar 36 of the rotors and wears against any vegetation, such as long grass, vines, or weeds which might be entangled with the rotor bars. Preferably, the plates are made of thick, heavy material such as steel, or are weighted, to bear more heavily against the vegetation to rub it off the rotors. Additionally, the vacuum at opening 14 tends to draw plates 62 in more tightly against the rotor bars to more effectively remove the vegetation therefrom.

The hydraulic circuit for driving motor 45 in one direction or the other is shown in FIG. 6. By actuation of valve 66, the rotors can be reversed to dislodge a stick which is too large to be fractured by the rotors. A pump 67, which draws hydraulic fluid from sump 68, is connected by pressure line 69 to pressure port 70 of valve 66. A relief valve 71 is connected to pressure line 69 to prevent the pressure therein from exceeding a desired maximum valve. The valve 66 has a shiftable valve member 72 therein which, when shifted to the left of the position shown, diverts pressure fluid to motor line 73. Hydraulic fluid passes through motor 45 and is exhausted through motor line 74, valve 66, and discharge port 75 which is connected to return line 76 leading to sump 68. When the valve member 72 is shifted to the right, pressure fluid is diverted to motor line 74 for passage through motor 45. Fluid is exhausted through motor line 73, valve 66, discharge port 77 to return line 76.

As shown in FIG. 1, nuts and debris is drawn into suction inlet opening 14. The nuts and most of the debris pass freely between the bars 36 of the stick-breaker for separation in the machine. Large sticks, however, such as stick 32 as shown in FIGS. 1 and 2, will span the gap between bars 36 on one rotor, such as the rotor 34. The bars of the rotors are in intermeshing relationship so that each bar of one rotor will penetrate a plane containing two bars of the other rotor. To prevent interference between the rotors, relief notches 80 are provided in the sideplates. Thus, with a stick such as 32 spanning two bars of rotor 34, a bar on rotor 33 will move into and fracture the stick. Although the fragments of the stick are drawn into the machine, they are not too large for separation from the nuts.

In the event an oversize stick is drawn between the rotors and the motor 45 does not have the power to fracture the stick, the motor will stall. In that event, the motor can be reversed by valve 66 to dislodge the stick.

Although the best mode contemplated for carrying out the present invention has been herein shown and described, it will be apparent that modification and variation may be made without departing from what is regarded to be the subject matter of the invention.

What is claimed is:

1. In a nut harvesting machine having means defining a suction opening adjacent the ground to draw nuts therefrom, a pair of rotors mounted in said opening, said rotors having central axles, respectively, aligned in parallel relation and said rotors each having a plurality of bars angularly spaced around the axle, the bars of said rotors intermeshed, and means to rotate said rotors in unison to fracture sticks drawn up into the suction opening.

2. The apparatus of claim 1 in which said bars are angularly spaced apart to allow the nuts to pass therethrough.

3. The apparatus of claim 1 including means to reverse said rotors to dislodge oversize sticks therefrom.

4. The apparatus of claim 1 including a plate mounted adjacent each rotor, said plate urged into engagement with the bars of said rotor to wipe vegetation therefrom.

5. In a nut harvesting machine having a suction system with a duct terminating in a suction opening, a pair of rotors mounted in said opening each having a central axis of rotation and each having angularly spaced bars mounted on the rotor around said axis, the bars of said respective rotors in intermeshing relationship, means to rotate said rotors in unison to fracture sticks received therebetween, and a plate mounted for engagement with the bars of each rotor as it rotates to wipe vegetation therefrom.

6. The apparatus of claim 5 in which said rotors are reversible to dislodge oversize sticks therefrom.

7. In a crop harvesting machine having a suction system including a duct with an inlet opening to receive the crops, a pair of rotors received in the opening, said rotors in intermeshing relationship, means to rotate the rotors in unison to fracture sticks drawn into the opening, a member pivotally mounted adjacent each rotor, and means to bias each member into engagement with the bars of one of the rotors to wipe the vegetation therefrom.

8. In a nut harvesting machine having a suction system including a duct with an inlet opening to receive the nuts, the improvement comprising a pair of rotors received in the opening, each rotor having sideplates journaled on an axis of rotation, each rotor having a plurality of bars spaced outwardly from and parallel to the axis of rotation, the bars on each rotor in sufficient intermeshing relationship with the bars of the other rotor to break a stick therebetween and adjacent bars on each rotor having sufficient inward radial clearance to permit bending and fracture of a stick engaging said adjacent bars by a bar on the other rotor.

9. The apparatus of claim 1 wherein said bars are radially spaced from the axle axis by a substantial distance with openings between the bars and the axle to allow the nuts to pass diametrically through the rotors.

10. The apparatus of claim 6 wherein said axles are stub axles to provide open centers for the rotors.

PO-1050
(5/69)

UNITED STATES PATENT OFFICE
CERTIFICATE OF CORRECTION

Patent No. 3,601,963　　　　　　　Dated August 31, 1971

Inventor(s) GLEN E. RAUTH

It is certified that error appears in the above-identified patent and that said Letters Patent are hereby corrected as shown below:

Column 2, line 15 - after "sideplates" insert a period.

Signed and sealed this 6th day of June 1972.

(SEAL)
Attest:

EDWARD M. FLETCHER, JR.　　　　　ROBERT GOTTSCHALK
Attesting Officer　　　　　　　　Commissioner of Patents